United States Patent
Holtkamp, Jr. et al.

(10) Patent No.: US 7,653,603 B1
(45) Date of Patent: Jan. 26, 2010

(54) NETWORK CONNECTED DELIVERY BOX USING ACCESS CODES AND METHODS FOR PROVIDING SAME

(76) Inventors: Reinhold Holtkamp, Jr., 6011 Martingale La., Brentwood, TN (US) 37027; Jean-Stephan Rovani, 4801 S. 23rd Rd., Arlington, VA (US) 22206

( * ) Notice: Subject to any disclaimer, the term of this patent is extended or adjusted under 35 U.S.C. 154(b) by 2052 days.

(21) Appl. No.: 09/594,829

(22) Filed: Jun. 16, 2000

Related U.S. Application Data

(60) Provisional application No. 60/139,372, filed on Jun. 16, 1999, provisional application No. 60/144,962, filed on Jul. 21, 1999.

(51) Int. Cl.
*G06F 17/60* (2006.01)
(52) U.S. Cl. .......................................... 705/72; 705/50
(58) Field of Classification Search ................. 705/72, 705/50
See application file for complete search history.

(56) References Cited

U.S. PATENT DOCUMENTS

| | | | |
|---|---|---|---|
| 5,774,053 A | | 6/1998 | Porter ......................... 340/568 |
| 5,937,037 A | * | 8/1999 | Kamel et al. .............. 379/88.19 |
| 6,536,189 B1 | * | 3/2003 | Murray ........................ 53/440 |

FOREIGN PATENT DOCUMENTS

| | | | |
|---|---|---|---|
| EP | 0 902 381 A2 | | 3/1999 |
| EP | 0902381 A2 | * | 3/1999 |
| FR | 2 563 987 | | 11/1985 |

* cited by examiner

*Primary Examiner*—Pierre E Elisca
(74) *Attorney, Agent, or Firm*—Arthur M. Peslak, Esq.; Madel & Peslak, LLC

(57) ABSTRACT

A network connected delivery box includes an input unit for inputting a user code. A communication unit communicates with a computer through the network so that an electrically controlled lock in the delivery box can be opened by a signal from the computer when the input user code matches a valid user code stored in the computer. Also provided is a method of managing purchase and delivery information associated with deliveries to a delivery box by storing, at a central computer, delivery information for each delivery by a delivery company. Aggregate and average delivery information is calculated and presented to a delivery box user to make an informed selection of a delivery company.

20 Claims, 12 Drawing Sheets

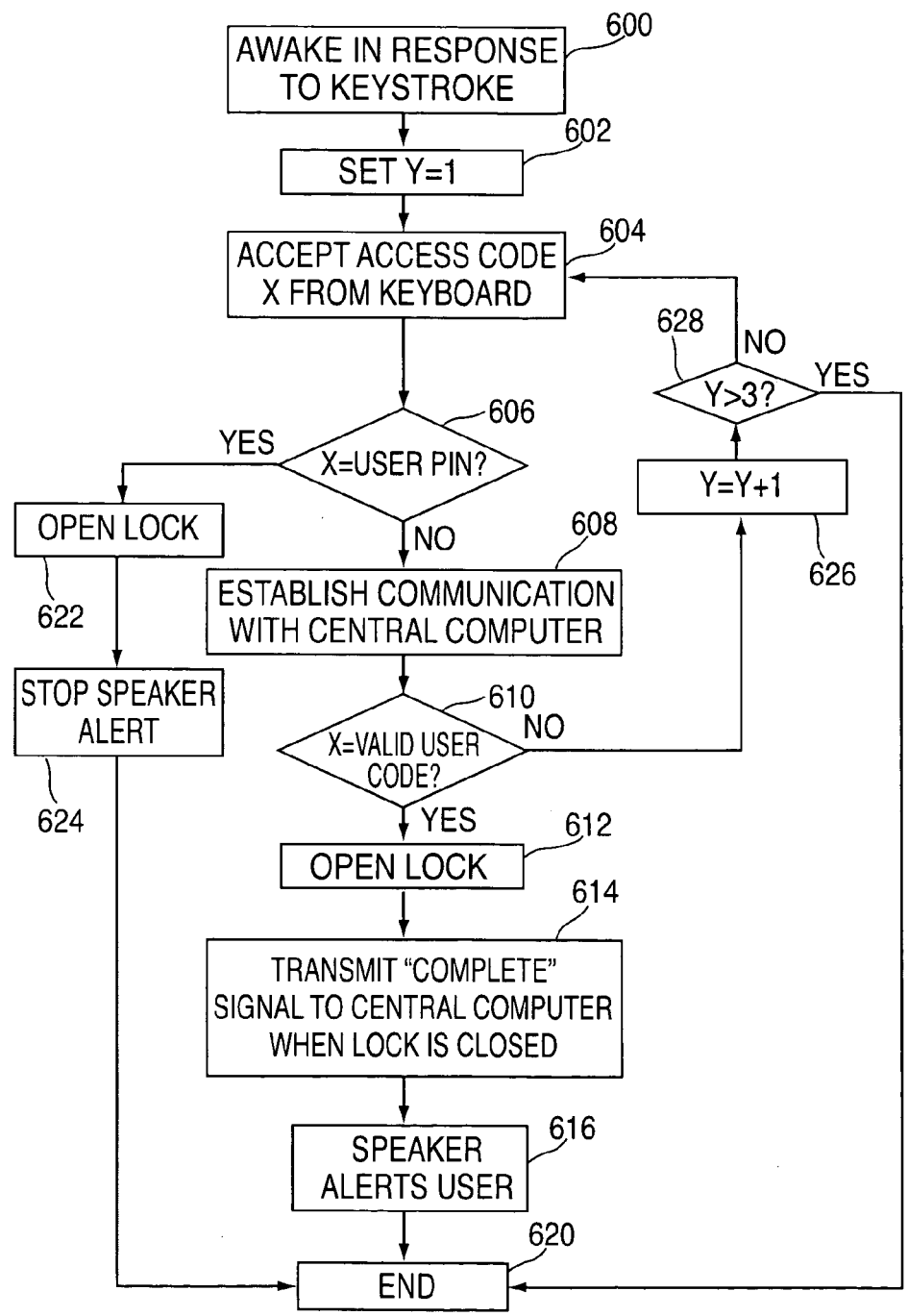

NETWORK CONNECTED DELIVERY BOX USING ACCESS CODES AND METHODS FOR PROVIDING SAME

CROSS-REFERENCE TO RELATED APPLICATIONS

This application claims the benefit of priority under 35 U.S.C. §119(e) to provisional application 60/144,962, filed on Jul. 21, 1999, and provisional application 60/139,372 filed on Jun. 16, 1999. The disclosure of both of these provisional applications are explicitly incorporated by reference herein.

BACKGROUND OF THE INVENTION

1. Field of the Invention

This invention relates to delivery boxes that are connected to a computer network, such as the Internet. These network connected delivery box allows users to receive shipment of items at any time and to a method for providing them. In particular, this invention relates to a network connected delivery box, which may be added or integrated to apartments, houses, offices or buildings and can be opened only with a valid access code. More specifically, this invention relates to a network connected delivery boxes that have a list of valid access codes which can be used to open the delivery box, wherein the delivery person is provided one of the valid access codes. Another feature of this invention relates to network connected delivery boxes that can communicate with a central computer over a network so that a valid user code can be generated and verified at the central computer. The central computer also stores and provides information related to purchase and deliveries of goods using the delivery box.

2. Description of the Related Art

Internet based or electronic commerce is growing dramatically, resulting in a dramatic increase in the delivery of products. For example, virtual grocery stores are satisfying customers' interest in having grocery items delivered to the consumers' home as a new convenience. The customer orders groceries on-line via the Internet or other wireless device or by phone, and a delivery company delivers the items to the consumers' home.

The conventional delivery method is to prearrange a delivery time between the delivery company and the customer and have the items delivered at that prearranged time. However, this conventional method requires the customer to be available in order for the delivery to be completed. Moreover, it causes extreme inefficiencies if the customer is not available at the prearranged time or if too many customers want to select the same delivery time. Therefore, there is a need for a delivery method that obviates the need for the customer to be available for the delivery to be completed.

Also, some items such as food, plants and flowers are perishable, and other items may be temperature-sensitive. Therefore, there is also a need for a delivery method that enables the delivery items to be kept at a desired temperature until the customer finally receives the items. Furthermore, there is a need to control the timing of the heating and cooling of a delivery box to ensure an optimum environment for the delivered goods as well as provide for efficient heating and cooling to optimize energy consumption.

Furthermore, certain items such as expensive goods or pharmaceuticals need to be stored in a secured manner until retrieved by the customer.

There is also a need for a user to access timely information about the quality of service of delivery companies so that a user or a goods provider can make an informed choice about which delivery service to use for a specific purpose.

There is also a need to store and track purchase and delivery information in order to improve service and customer relationship management related to the purchase and delivery of goods using a delivery box.

SUMMARY OF THE INVENTION

Therefore, it is an object of the present invention to provide a network connected delivery box and delivery method that obviates the need for the customer to be available in order to have the delivery completed.

Another object of the present invention is to provide a self-contained delivery box, which may be added or integrated to houses, offices or buildings and can be opened only with a valid access code.

Still another object of the present invention is to provide a method for providing such a self-contained delivery box.

Still another object of the present invention is to provide a delivery box that can communicate with a central computer so that a valid user code can be verified at the central computer.

Still another object of the present invention is to provide a method for enabling such a delivery box to communicate with such a central computer to generate and/or validate such a user code.

Still another object of the present invention is to provide a delivery box that can download a valid user code from the central computer.

Still another object of the present invention is to provide a method for enabling a delivery box to communicate with such a central computer to download such a user code.

Another object of the present invention is to provide data management services through the central computer at a delivery box company for delivery box users, goods suppliers or delivery companies.

It is a further object of the present invention to provide a delivery box and delivery method that enables the delivery items to be kept at a desired temperature until the customer receives the delivery items.

Still another object of the present invention is to provide a secure delivery box for storage of valuable items or pharmaceuticals.

These and other objects are achieved, in one aspect of the present invention, by a network connected delivery box for providing secured delivery of goods to a user. The network connected delivery box includes an input means for inputting a user code, a communication means for communicating with a computer, an electrically controlled lock that can be unlocked by a lock control signal, and a controller means for controlling the functions of the input means, the communication means, and the lock, wherein the communication means establishes communication with the computer, transmits the input user code to the computer, and receives a control signal to open the lock from the computer when the input user code coincides with one of at least one valid user code stored in the computer; and the lock opens in response to the lock control signal which is provided to the lock by the controller means in response to the receipt of the control signal from the computer.

In another aspect of the present invention, a method for providing secured delivery of goods to a user by utilizing a delivery box that can only be opened by inputting one of at least one valid user code stored in a remote central computer or by inputting a user PIN stored in the delivery box is provided, includes the steps of accepting a user code from an input means on the delivery box, comparing the input user code with a user PIN stored in the delivery box, the delivery box controlling a lock in the delivery box to open when the input user code coincides with the user PIN, establishing communication between the delivery box and the central computer when the input user code does not coincide with the user PIN, and controlling the lock in the delivery box to open when the input access code coincides with one of said at least one valid user code.

In still another aspect of the present invention, a delivery box for providing secured delivery of goods to a user is provided, includes an input means for inputting a user code, a communication means for communicating with a computer, an electrically controlled lock that can be unlocked by a lock control signal, a memory means for storing at least one valid user code, and a controller means for controlling the functions of the input means, the communication means, the lock, and the memory means, wherein the communication means establishes communication with the computer and downloads at least one valid user code from the computer, the valid user code being stored in the memory means, the controller means compares the input user code with the at least one valid user code and generates a lock control signal to open the lock when the input user code coincides with one of the at least one valid user code, and the lock opens in response to the lock control signal provided to the lock by the controller means.

In still another aspect of the present invention, a method for providing secured delivery of goods to a user by utilizing a delivery box that can only be opened by inputting one of at least one valid user code or by inputting a user PIN stored in the delivery box is provided, including the steps of establishing communication between the delivery box and a remote computer, downloading at least one valid user code from the computer to the delivery box, accepting a user code from an input means on the delivery box, and comparing the input user code with a user PIN stored in the delivery box and the at least one valid user code, the delivery box controlling a lock in the delivery box to open when the input user code coincides with either the user PIN or one of the at least one valid user code.

In still another aspect of the present invention, a method for managing purchase and delivery information in a delivery system includes a delivery box user, a delivery box company, a goods supplier, a delivery company, and a delivery box is provided, including the steps of detecting, tracking and storing a purchase order for goods transmitted from the delivery box user to the goods supplier by a computer in the delivery box company so as to form a database of information on purchases by the delivery box user, providing a valid user code to be used to open the delivery box from the delivery box company to the delivery company and maintaining a database of information on delivery by tracking the user code, and transmitting a "complete" signal from the delivery box to the computer in the delivery box company after the delivery of goods by the delivery company is complete so as to update the database of delivery information.

In still another aspect of the present invention, a method for managing purchase and delivery information in a delivery system comprising a delivery box user, a delivery box company, a goods supplier, a delivery company, and a delivery box is provided, includes the steps of providing a purchase order from the delivery box user to the delivery box company, relaying the purchase order from the delivery box company to the goods supplier and maintaining the information on the purchase order in the delivery box company so as to form a database of information on purchases by the delivery box user, providing a valid user code to be used to open the delivery box from the delivery box company to the delivery company and maintaining a database of information on delivery by tracking the user code, and transmitting a "complete" signal from the delivery box to the computer in the delivery box company after the delivery of goods by the delivery company is complete so as to update the database of delivery information.

Another aspect of the present invention provides a method of managing the purchase, delivery, and user information in a delivery system including a delivery box user, a delivery company, and delivery box, the method includes the steps of: receiving a purchase order for goods from the delivery box user and associating, at a central computer, a valid user code with the purchase order; delivering the ordered goods to the delivery box by providing, at the delivery box, a user code by the delivery company, verifying the provided user code by comparing to the valid user code, and providing access to the delivery box if the provided user code matches the valid user code. The method also includes, storing at the central computer, delivery information for each delivery, and providing, to a delivery box user, aggregate and average delivery information for each delivery company. The method also includes providing a choice to the delivery box user to select a delivery company after viewing aggregate and average delivery information for each delivery company.

Further objects, aspects and advantages of the present invention are apparent in the drawings and in the detailed description, which follow.

BRIEF DESCRIPTION OF THE DRAWINGS

FIG. 6A is a flowchart illustrating how the delivery box 400 shown in FIG. 4 and the control panel 402 shown in FIGS. 4 and 5 operate to verify a user code at a central computer when a delivery person tries to place the delivery items into the delivery box.

DETAILED DESCRIPTION OF THE PREFERRED EMBODIMENT(S)

Figure 1:
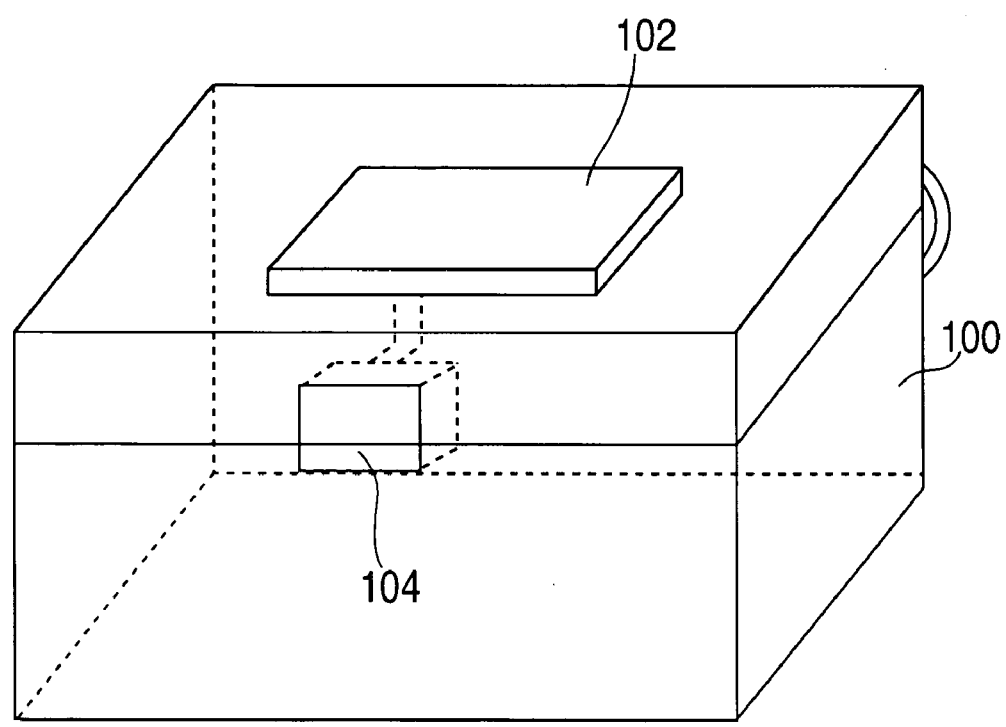
FIG. 1 shows a delivery box according to a preferred embodiment of the present invention.

Referring to FIG. 1, a delivery box 100 according to the first preferred embodiment of the present invention is shown. The delivery box 100 is a self-contained box which may be integrated or added to the house, office or building. The delivery box 100 may or may not be thermally insulated depending on the intended use of the delivery box 100. The delivery box 100 can be used together with heating/cooling means such as a pre-charged gel heat or cold pouch to keep cold items cold and warm items warm. Thermal insulation of the delivery box 100 will make the use of the heating/cooling means more efficient.

The delivery box 100 includes a control panel 102 and an electrically controlled lock 104. The control panel 102 is configured so that the delivery person can input an access code (also referred to herein as "user code") into the delivery box. The access code is compared to a list of valid access codes available to the delivery box 100, and the lock 104 is opened when the access code input by the delivery person matches one of valid the access codes. The lock 104 is electrically connected to the control panel 102 and is opened electrically, and the manner in which the lock 104 is opened electrically would be obvious to a person skilled in the art. The delivery person may obtain the access code from a delivery box company that is maintaining the delivery box, prior to the delivery. However, the access code may also be a code such as an order number, delivery number or airway number so that the delivery person does not have to obtain a separate access code for the delivery. The delivery box user has a user PIN (Personal Identification Number) that can always be used to open the delivery box 100.

Figure 2:
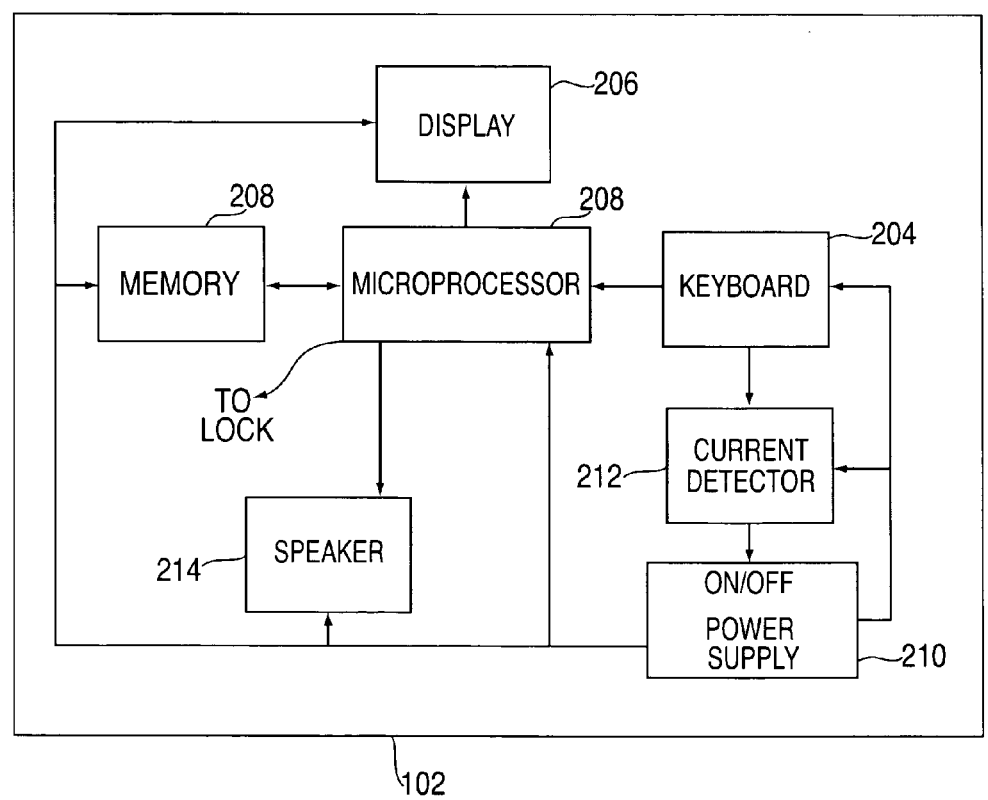
FIG. 2 is a block diagram illustrating the circuit components contained within the control panel 102 shown in FIG. 1.

Referring to FIG. 2, a block diagram illustrating the circuit components contained within the control panel 102 (FIGS. 1 and 2) is shown. The control panel 102 comprises a microprocessor 202, a keyboard 204, a display 206, a memory 208, a power supply 210, a current detector 212 and a speaker 214. The microprocessor 202 controls the operations of the display 206, the memory 208, the lock 104 (FIG. 1) and the speaker 214, and receives data input from the keyboard 204.

The power supply 210 contains a conventional battery and is configured to provide electrical power always to the keyboard 204 and to the current detector 212. However, in a preferred embodiment, the power supply 210 provides electrical power to the microprocessor 202, display 206, memory 208 and speaker 214 only after the current detector 212 detects the presence of current from the keyboard 204. When any one of the keys of the keyboard 204 is struck, a current is generated from the keyboard 204 that triggers the current detector 212 to generate a signal that makes the power supply 210 provide electrical power to the microprocessor 202, display 206, memory 208 and speaker 214. The power supply 210 is also electrically connected to the lock 104 (FIG. 1) and is configured to cease the supply of electrical power to the microprocessor 202, display 206 and memory 208 after a time delay with no keystrokes and no speaker alert. The power supply 214 is also configured to cease the supply of electrical power to the speaker 214 when the user inputs a user PIN. In this manner, power consumption by the electronic circuitry on the control panel 102 (FIGS. 1 and 2) can be significantly reduced, thereby increasing the time period during which the battery in the power supply 210 can be used. However, the power supply could also be configured to always provide electrical power to all the components shown in FIG. 2.

The microprocessor 202 receives data input from the keyboard 204, reads and writes data to and from the memory 208, performs computation functions that a conventional microprocessor is capable of performing, and controls the display 206 to display data. The microprocessor 202 also controls the lock 104 (FIG. 1) to open or close the delivery box 100 (FIG. 1). The lock 104 is designed to respond to short-duration pulses from the microprocessor 202 by entering a mechanically-stable locked state in response to one pulse (or a particular sequence of pulses) and by entering a mechanically-stable unlocked state in response to a different pulse (or a different sequence of pulses). The lock 104 thus maintains its locked or unlocked state constantly in the absence of a pulse received from the microprocessor 202. The memory 208 is a conventional memory such as an EEPROM from which data can be read and to which data can be written. The memory 208 contains all the valid access codes available to the delivery box 100 and a user PIN that is used by the delivery box user to open it. The user PIN is always valid to open the delivery box and can be changed by the delivery box user. The display 206, in a preferred embodiment, is a conventional display device such as an LCD (Liquid Crystal Display) that is controlled by the microprocessor 202 to display data. The speaker 214 is controlled by the microprocessor 202 to produce sound pulses so that the delivery box user is alerted when items have been placed in the delivery box 100. Alternatively, the delivery box 100 may generate a periodic, low energy radio signal as an alert signal (801 in FIG. 8) that can cause a radio receiver within the house, office or building to signal either visually (with a light) or audibly, or both.

Figure 3:
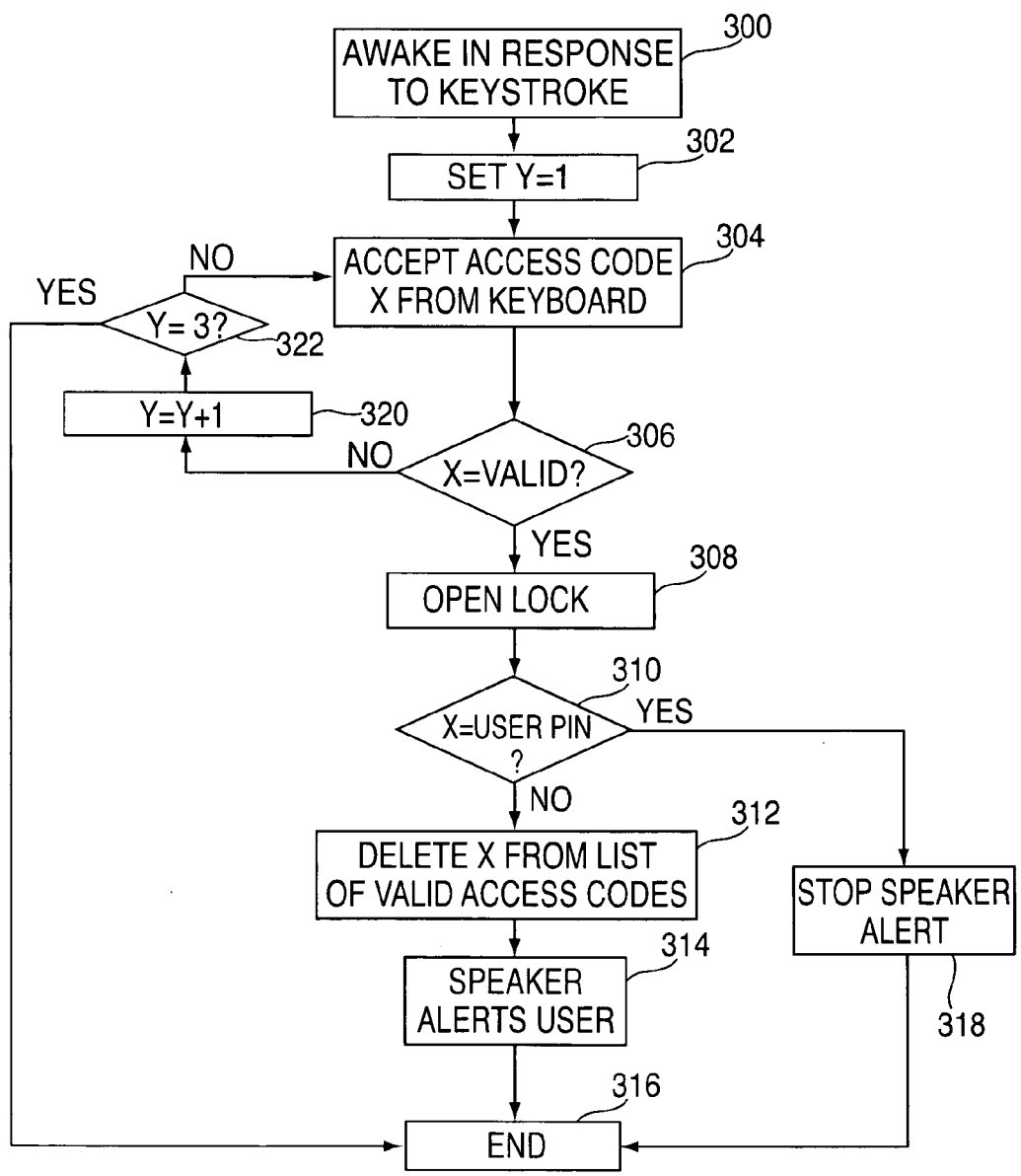
FIG. 3 is a flowchart illustrating how the delivery box 100 shown in FIG. 1 and the control panel 102 shown in FIGS. 1 and 2 operate when a delivery person tries to place the delivery items into the delivery box.

FIG. 3 is a flowchart that illustrates how the delivery box 100 (FIG. 1) and the control panel 102 (FIGS. 1 and 2) operate when a delivery person tries to place the delivery items into the delivery box 100 (FIG. 1). The flowchart in FIG. 3 will be described also with reference to FIGS. 1 and 2.

The delivery person strikes the keyboard 204 (FIG. 2). This causes the current detector 212 (FIG. 2) to detect current and to cause the power supply 210 (FIG. 2) to provide electrical power to the microprocessor 202 (FIG. 2), memory 208 (FIG. 2), display 206 (FIG. 2), and speaker 214 (FIG. 2) (Step 300). A variable Y in the microprocessor 202 (FIG. 2) is set to a value "1" (Step 302). The variable Y is used to count the number of times the delivery person tried to input a valid access code but failed. Then, the access code X input by the delivery person at the keyboard 204 (FIG. 2) is accepted by the microprocessor 202 (FIG. 2) (Step 304).

Then, the microprocessor 202 (FIG. 2) looks up the list of Valid access codes stored in the memory 208 (FIG. 2) to check whether the access code input by the delivery person in Step 302 is a valid access code (Step 306). If it matches one of the valid access codes, the microprocessor 202 controls the lock 104 (FIG. 1) to be opened so that the delivery person can put the delivery items in the delivery box 100 (FIG. 1) (Step 308). Then, the microprocessor 202 (FIG. 2) checks whether the used access code X is the user PIN (Step 310). If the used access code X is not the user PIN, then it is deleted from the list of valid access codes in the memory 208 (FIG. 2) so that that the access code X cannot be used again (Step 312). Thereafter, the microprocessor 202 (FIG. 2) causes the speaker 214 (FIG. 2) to alert the delivery box user that an article has been put inside the delivery box 100 (FIG. 1) (Step 314). Preferably, the alert is formed by brief, spaced-apart audio pulses that do not require much battery power over time. The alert is kept on until the delivery box user opens the delivery box 100 (FIG. 1) using the user PIN. In Step 316, the procedures come to an end. If the used access code X is the user PIN in Step 310, then the used access code is not deleted from the list of valid access codes, and the microprocessor stops the speaker from alerting the user (Step 318) before the procedure comes to an end (Step 316).

If the code input by the delivery person in Step 302 is not a valid access code, then Y is incremented by one (Step 320). If Y is larger than a predetermined number, such as three (3), in Step 322, then the procedure comes to an end, and the power supply 210 (FIG. 2) ceases to supply electrical power to the microprocessor 202 (FIG. 1), memory 208 (FIG. 1) or display 206 (FIG. 1) (Step 316). If Y is not larger than three (3) in Step 322, then the procedure returns to Step 302 so that the delivery person can input a new access code. The number "three" that is compared with Y in Step 322 can be changed depending on how many times the user wants the delivery person to be able to try to input a valid access code.

According to the delivery box illustrated in FIGS. 1, 2 and 3, a self-contained delivery box that can be operated without any communication with a central computer at the delivery box company is provided. The delivery person can obtain a certain number of access codes from the delivery box company and use those access codes for the delivery of any items. The delivery box will open when the delivery person uses a valid access code to open it. Once the access code is used to open the delivery box, the access code is deleted from the list of valid access codes stored in the delivery box so that the used access codes cannot be used again. The user can always open the delivery box using the user PIN, and the user PIN is not deleted from the list of valid access codes except when it is changed by the user. In this manner, a delivery box is provided that can always be opened by the delivery box user using the user PIN number but can only be opened by a delivery person using a valid access code purchased from the delivery box company.

Furthermore, since a particular access code can be deleted from the list of valid access codes after access by a delivery person, that delivery person has no further access to the delivery box. In this way, the security of the delivery box is preserved even after access by a delivery person. In addition, in one embodiment, the delivery box can be formed with several separate compartments each accessible by a separate access code. In this arrangement, several different deliveries can be made to the respective compartments without any risk of interference between the deliveries or any risk that a second delivery person with a valid access code have access to goods that may have been delivered by a first delivery person having a different valid access code. Because the delivery box cannot be opened by anyone else except the delivery person who has a valid access code or the user who has the user PIN, the delivery person can simply put the articles into the delivery box and lock it without arranging a time for delivery with the delivery box user prior to making the delivery. Also, certain items such as expensive goods or pharmaceuticals can be stored in the delivery box in a secure manner until retrieved by the delivery box user. The delivery box alerts the user by sound that items have been put into the delivery box, and the alert is deactivated when the user opens the box using the user PIN.

Furthermore, the delivery box can be configured to maintain delivery information such as the delivery and receipt time or the used access code. In this manner, the delivery person's identity and the relevant delivery information can be tracked.

Figure 4:
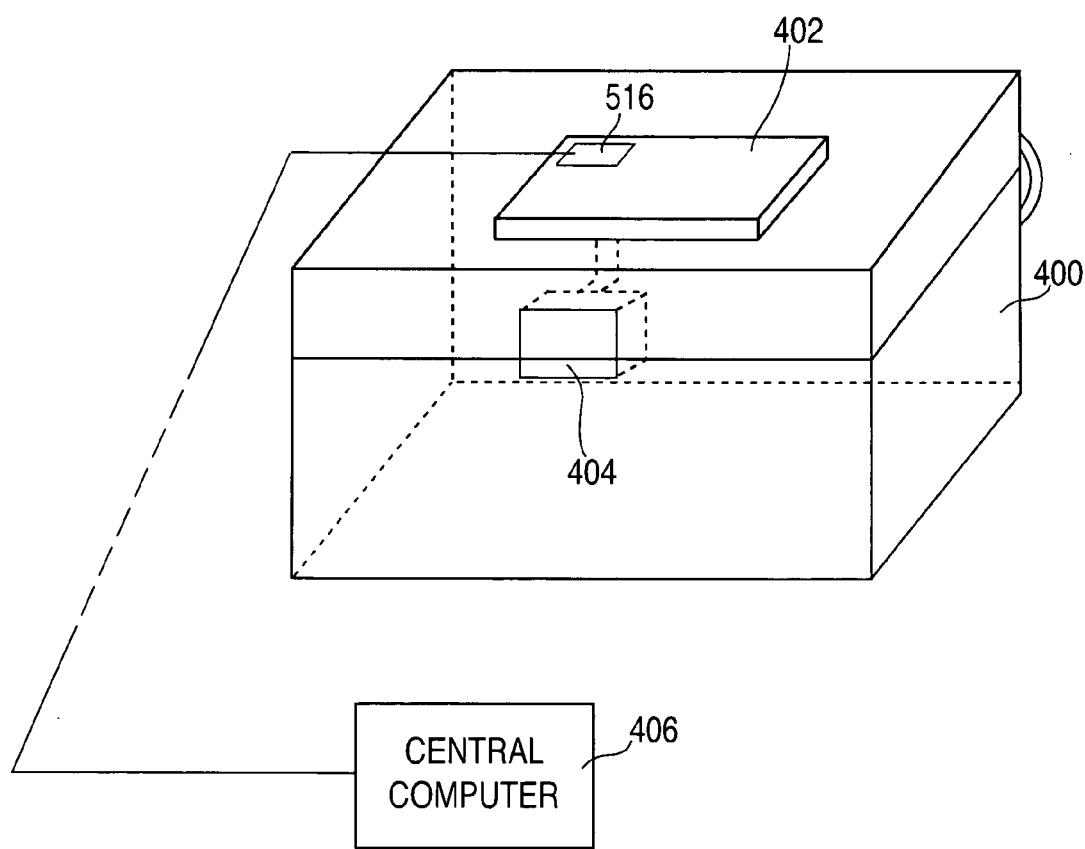
FIG. 4 shows a delivery box according to a second preferred embodiment of the present invention.

FIG. 4 shows a delivery box 400 designed in accordance with a second preferred embodiment of the present invention. The delivery box 400 may be integrated or added to a house, apartment, office, or building. The delivery box 400 may or may not be thermally insulated, depending upon the intended use of the delivery box 400. The delivery box 400 can be used together with heating/cooling means, such as a pre-charged gel heat or cold pouch, to keep cold items cold and warm items warm. Thermal insulation of the delivery box 400 will make the use of the heating/cooling means more efficient.

The delivery box 400 includes a control panel 402 and an electrically controlled lock 404. The control panel 402 further comprises a communication means 516 for communicating with a central computer 406 at the delivery box company. It should be understood that the central computer 406 can be implemented in several different ways that would be apparent to one skilled in the art. Therefore, the central computer could be implemented as a mainframe computer or a suitably programmed distributed computer system having appropriate peripherals and system, application, and database software.

In this embodiment, the user codes are not stored in the delivery box itself but are stored in the central computer 406. Only a user PIN is stored in the delivery box 400 itself. The control panel 402 is configured so that the delivery person can input a user code into the delivery box 400. The user code is transmitted to the central computer 406 to be checked whether it matches a valid user code. If it matches a valid user code, the central computer commands the delivery box 400 to open the lock 404. The lock is opened electrically, and the manner in which the lock is opened electrically would be obvious to a person skilled in the art. The delivery person may obtain a valid user code from the delivery box company that is maintaining the delivery box before the delivery. However, the user code may also be a code such as an order number, delivery number or airway number so that the delivery person does not have to obtain a separate user code for the delivery. The central computer 406 keeps track of all the deliveries made to the delivery box by the user code, so that a fee can be charged to a user account using the user code. Therefore, the same user code can be used for more than one delivery by the same delivery service. The delivery box user has a user PIN that can always be used to open the delivery box 400.

Alternatively, valid user codes may be downloaded from the central computer 406 and stored in the delivery box 400 before a delivery person inputs a user code. If the input user code matches one of the valid user codes, then the lock is opened.

It should be noted that the user codes can be generated and stored in the central computer by a variety of different techniques. The central computer 406 (or a computer system associated with the central computer) may provide a delivery box user with an electronic interface to generate the user code. For example, the central computer could provide a web-enabled interface that is accessible by a delivery box user either through the Internet or an intranet or by some other private network. In another embodiment, the user codes could also be communicated to the central computer 406 by another computer system which provides the interface for a delivery box user. Finally, the generation of the user code could also be associated by a goods ordering process used by the delivery box user. For example, during the ordering process, a unique user code can be generated that is communicated and stored at the central computer while it is also forwarded to a delivery company or a goods supplier.

In addition, it should be noted that the central computer could associate the user codes with particular delivery boxes by a variety of different mechanisms. For example, a user account number could be used to correlate the delivery box and the associated user codes so that the user account number is communicated by the delivery box whenever it establishes communications with the central computer. Alternatively, the delivery box could be associated with a unique IP (or other network) address that is associated with the delivery box user in the central computer so that the IP address is used to determine the valid user (or access) codes associated with either a delivery box or a delivery box user.

Figure 5:
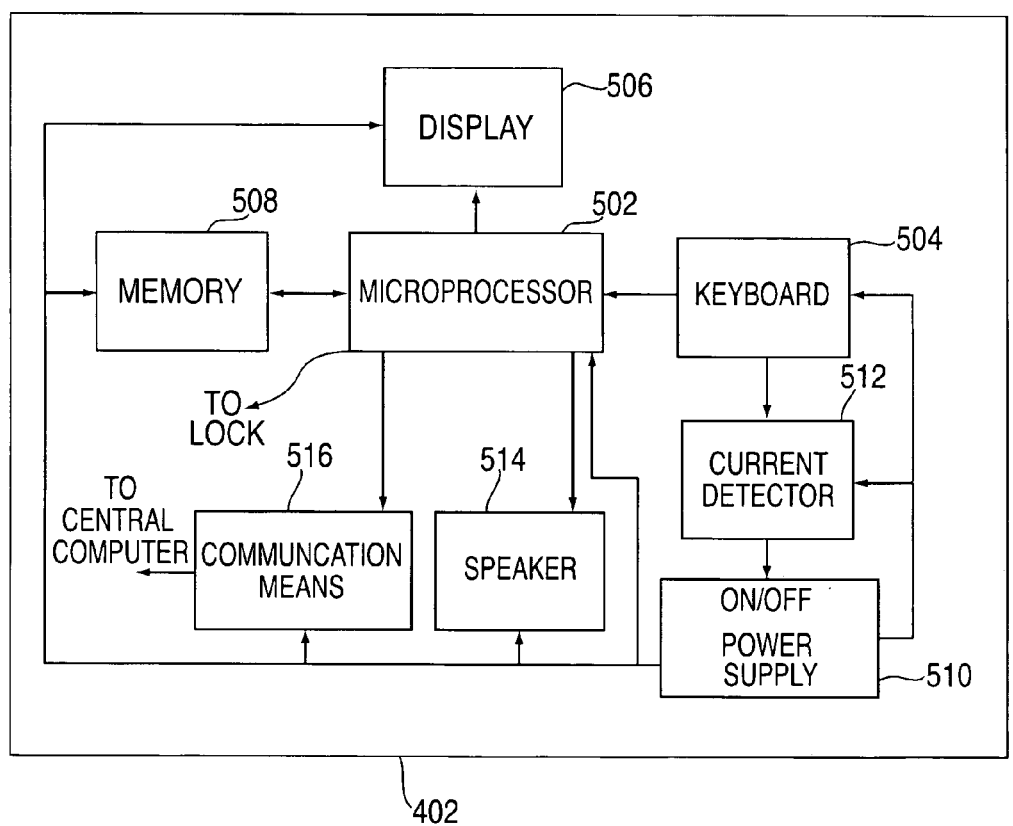
FIG. 5 is a block diagram illustrating the circuit components contained within the control panel 402 shown in FIG. 4.

Referring to FIG. 5, a block diagram illustrating the components of the control panel 402 (FIGS. 4 and 5) is shown. The control panel 502 comprises a microprocessor 502, a keyboard 504, a display 506, a memory 508, a power supply 510, a current detector 512, a speaker 514 and the communication means 516. The microprocessor 502 controls the operations of the display 506, memory 508, speaker 514, the lock 404 (FIG. 4) and the communication means 516, and it receives data input from the keyboard 504.

It should be understood that the keyboard 504 is one example of an input device by which information can be input to the microprocessor 502. One skilled in the art would recognize that voice recognition hardware and software, palm print or fingerprint recognition devices, devices accepting data transmitted from palmtops, laptops or other portable computing devices by optical or other means, or a card reader can also be used as an input device instead of the keyboard 504.

The communication means 516 can be, for example, a UART (Universal Asynchronous Receiver Transmitter) and a MODEM that enable the microprocessor 502 to communicate with the central computer 406 via a telephone line or a cellular link or the like. One skilled in the art would recognize that other communication means could also be used with the present invention. Therefore, any suitable wireline, wireless, cellular, RF, microwave and/or satellite communications could be used with the communication means 516. The communication means 516 would be configured with the appropriate hardware, firmware, and software suitable for one or more of the communication techniques used.

The power supply 510 contains a conventional battery, and it is configured to provide electrical power always to the keyboard 504 and to the current detector 512. However, the power supply 510 provides electrical power to the microprocessor 502, display 506, memory 508, speaker 514 and the communication means 516 only after the current detector 512 detects the presence of such current from the keyboard 504. When any one of the keys of the keyboard 504 is struck, a current is generated from the keyboard 504 that triggers the current detector 512 to generate a signal that causes the power supply 510 provide electrical power to the microprocessor 502, display 506, memory 508, speaker 514 and the communication means 516. The power supply 510 is also electrically connected to the lock 404 (FIG. 4) and is configured to cease the supply of electrical power to the microprocessor 502, display 506, memory 508 and the communication means 516 after a time delay if there is no key strokes or no speaker alert. The power supply is also configured to cease the supply of electrical power to the speaker 514 when the user inputs the user PIN. In this manner, power consumption by the electronic circuitry on the control panel 402 (FIGS. 4 and 5) can be significantly reduced, thereby increasing the time period during which the battery in the power supply 510 can be used. However, the power supply also can be configured to always provide electrical power to all the components shown in FIG. 5.

The microprocessor 502 receives data input from the keyboard 504, reads or writes data to and from the memory 508, performs computation functions that a conventional microprocessor is capable of performing, and controls the display 506 to display data. The microprocessor 502 also communicates with the central computer 406 via the communication means 516, and can control the lock 404 (FIG. 4) to open or close the delivery box 400 (FIG. 4). The memory 508 is a conventional memory such as an EEPROM from which data can be read and to which data can be written. The memory 508 contains the user PIN that is used by the delivery box user to open the delivery box 400 (FIG. 4) or valid user codes downloaded from the central computer 406 (FIG. 4). The user PIN is always valid to open the delivery box, and it can be changed by the delivery box user.

In the preferred embodiment, the display 506 is a conventional display device such as LCD that is controlled by the microprocessor 502 to display data. However, one skilled in the art would recognize that other embodiments of the display 506 may also be used and may include voice, video, animations or other multimedia output or other data output that is formatted for use by another device.

In the preferred embodiment, the speaker 514 is controlled by the microprocessor 502 to produce sound so that the delivery box user is alerted that items have been placed in the delivery box 400. Furthermore, one skilled in the art would recognize that the alert produced by the speaker 502 can also be produced by other means, such as, a voice alert, a visual indication, an e-mail sent via a computer network such as the Internet, placement of a graphics icon or other indication at a computer or communication device (desktop, laptop, palmtop, wireless phone with a display screen).

Alternatively, an alert signal (801 in FIG. 8) may be generated, as described above.

FIG. 6A is a flowchart that illustrates how the delivery box 400 (FIG. 4) and the control panel 402 (FIGS. 4 and 5) operate to verify a user code at a central computer when a delivery person tries to place the delivery items in the delivery box 400 (FIG. 4). The flowchart in FIG. 6A will be described with reference to FIGS. 4 and 5.

The delivery person strikes the keyboard 504 (FIG. 5). This causes the current detector 512 (FIG. 5) to detect current and so the power supply 510 (FIG. 5) to provide electrical power to the microprocessor 502 (FIG. 5), memory 508 (FIG. 5), the display 506 (FIG. 5), the speaker 514 (FIG. 5) and the communication means 516 (FIG. 5) (Step 600). Then, a variable Y in the microprocessor 502 (FIG. 5) is set to a value "1" (step 602). The variable Y is used to count the number of times the delivery person tried to input a valid user code but failed. Thereafter, the user code X input by the delivery person at the keyboard 504 (FIG. 5) is accepted by the microprocessor 502 (FIG. 5) (Step 604).

The microprocessor 502 (FIG. 5) checks whether the user code is the user PIN stored in the memory 508 (Step 606). If the user code is not the user PIN, the microprocessor 502 (FIG. 5) causes the communication means 516 (FIG. 5) to communicate with the central computer 406 (FIG. 4) via a telephone line or other communication means so that communication is established between the delivery box 400 (FIG. 4) and the central computer 406 (FIG. 4) (Step 608). Then, the user code X input by the delivery person is transmitted to the central computer 406 (FIG. 4) and checked whether it matches any one of the valid user codes stored in the central computer (Step 610). If the user code X is valid, the central computer 406 (FIG. 4) transmits a control signal to the microprocessor 502 (FIG. 5) so that the microprocessor 502 (FIG. 5) causes the lock 404 (FIG. 4) to open (Step 612). After the delivery person puts the delivery items into the delivery box 400 (FIG. 4) and closes it, the microprocessor 502 (FIG. 5) causes the communication means 516 (FIG. 5) to transmit a "complete" (or completion) signal to the central computer 406 (FIG. 4), so that the central computer 406 (FIG. 4) can keep track of the completion of each delivery made by using the delivery user code X (Step 614). Then, the microprocessor 502 (FIG. 5) causes the speaker 514 (FIG. 5) to alert the delivery box user that an article has been put inside the delivery box 400 (FIG. 4) (Step 616). In a preferred embodiment, the alert keeps generating brief, spaced-apart audio pulses until the user opens the delivery box 400 (FIG. 4) using the user PIN. Then, the procedure comes to an end (Step 620).

If the user code input by the delivery person in Step 602 is not a valid user code in Step 610, then Y is incremented by one (Step 626). If Y is larger than three (3) in Step 628, then the procedure comes to an end and the power supply 510 (FIG. 5) ceases to supply electrical power to the microprocessor 502 (FIG. 5), memory 508 (FIG. 5), the communication means 516 (FIG. 5) or the display 506 (FIG. 5) (Step 620). If Y is not larger than three (3) in Step 628, then the procedure returns to Step 602 so that the delivery person can input a new user code. The number "three" that is compared with Y in Step 628 can be changed depending upon how many times the user wants the delivery man to be able to try to input a valid user code.

If the input user code X is the user PIN in Step 606, then the microprocessor 502 (FIG. 5) controls the lock 404, (FIG. 4) to open without any communication with the central computer 406 (FIG. 4) (Step 622). Thereafter, the microprocessor 502 (FIG. 5) controls the speaker 514 (FIG. 5) to stop the alert to the user (Step 624). Then, the procedure comes to an end (Step 620).

Figure 6B:
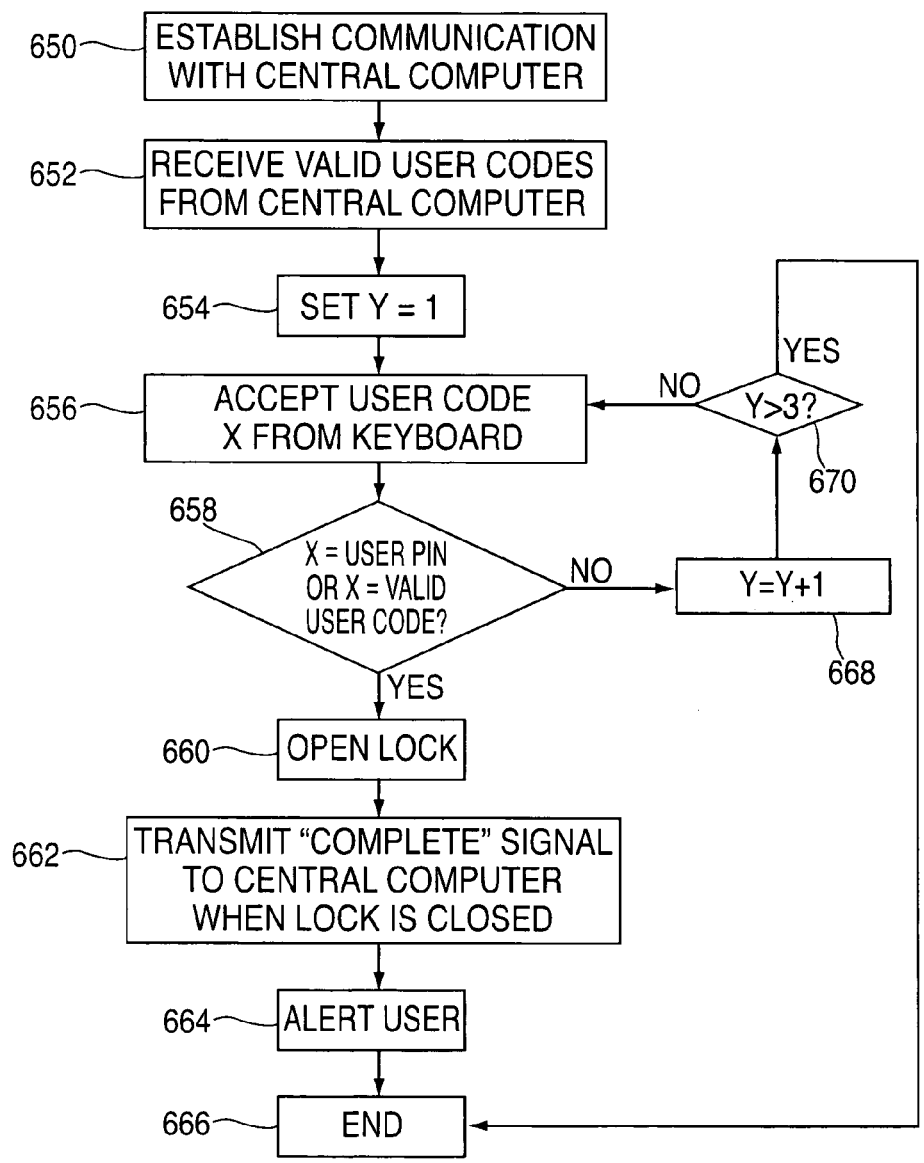
FIG. 6B is a flowchart illustrating how the delivery box 400 shown in FIG. 4 and the control panel 402 shown in FIGS. 4 and 5 operate to download a user code from the central computer when a delivery person tries to place the delivery items into the delivery box.

FIG. 6B is a flowchart illustrating how the delivery box 400 shown in FIG. 4 and the control panel 402 shown in FIGS. 4 and 5 operate to download a user code from the central computer when a delivery person tries to place the delivery items into the delivery box, as an alternative method of communicating with the central computer 406 (FIG. 4).

First, communication between the delivery box 400 (FIG. 4) and the central computer 406 (FIG. 4) is established (Step 650). The delivery box receives valid user codes from the central computer 406 (FIG. 4) (Step 652). It should be noted that in one embodiment, the valid user codes can be periodically downloaded from the central computer sufficiently in advance of an attempted access of the delivery box by a delivery person. In this manner, any risk of failure of the communication means at the time of the attempted delivery is minimized since the valid user codes are already downloaded to the delivery box. If there is a problem in the download process, the delivery company can be advised of the delay sufficiently in advance so that alternate or backup arrangements can also be used.

Returning to the flowchart in FIG. 6, in step 654, the variable Y is set to 1. A user code X input to the delivery box 400 (FIG. 4) is accepted from the keyboard 504 (FIG. 5) (Step 656). If the user code X coincides with either the user PIN or one of the valid user codes in Step 658, then the lock is opened (Step 660). Then, a "complete" signal is transmitted to the central computer 406 (FIG. 4), when the lock is closed again after being opened by the valid user code (Step 662). Then the user is alerted of the delivery (Step 664), and the procedure comes to an end (Step 666).

If the user code X does not coincide with either the user PIN or one of the valid user codes in Step 658, then Y is incremented by one (Step 668). If Y is larger than three (3) in Step 670, then the procedure comes to an end (Step 666). If Y is not larger than three (3) in Step 670, then the procedure returns to Step 656 so that the delivery person can input a new user code. The number "three" that is compared with Y in Step 670 can be changed depending upon how many times the user wants the delivery person to be able to try to input a valid user code.

According to the delivery box illustrated in FIGS. 4, 5, 6A and 6B, a delivery box that is operated by communication with the central computer at a delivery box company is provided. The delivery person can open a user account at the delivery box company to obtain a valid user code. The delivery box company will charge the user account according to the number of deliveries that the delivery person made using the authorized user code. The box will open when the delivery person uses a valid user code to open it. The same user code may be used more than one time. In this manner, in one embodiment, a delivery box is provided that can always be opened by the delivery box user using the user PIN number but can only be opened by a delivery person using a valid user code given to the delivery person when he/she opens a user account with the delivery box company. Because the delivery box cannot be opened by anyone else except the delivery person who has a valid user code or the user who has the user PIN, the delivery person can simply put the items in the delivery box and lock it without prearranging a precise time for delivery with the delivery box user before he or she makes the delivery. Also, certain items such as expensive goods or pharmaceuticals can be stored in the delivery box in a secure manner until retrieved by the delivery box user. The delivery box alerts the user by sound that items have been put into the delivery box.

Figure 7:
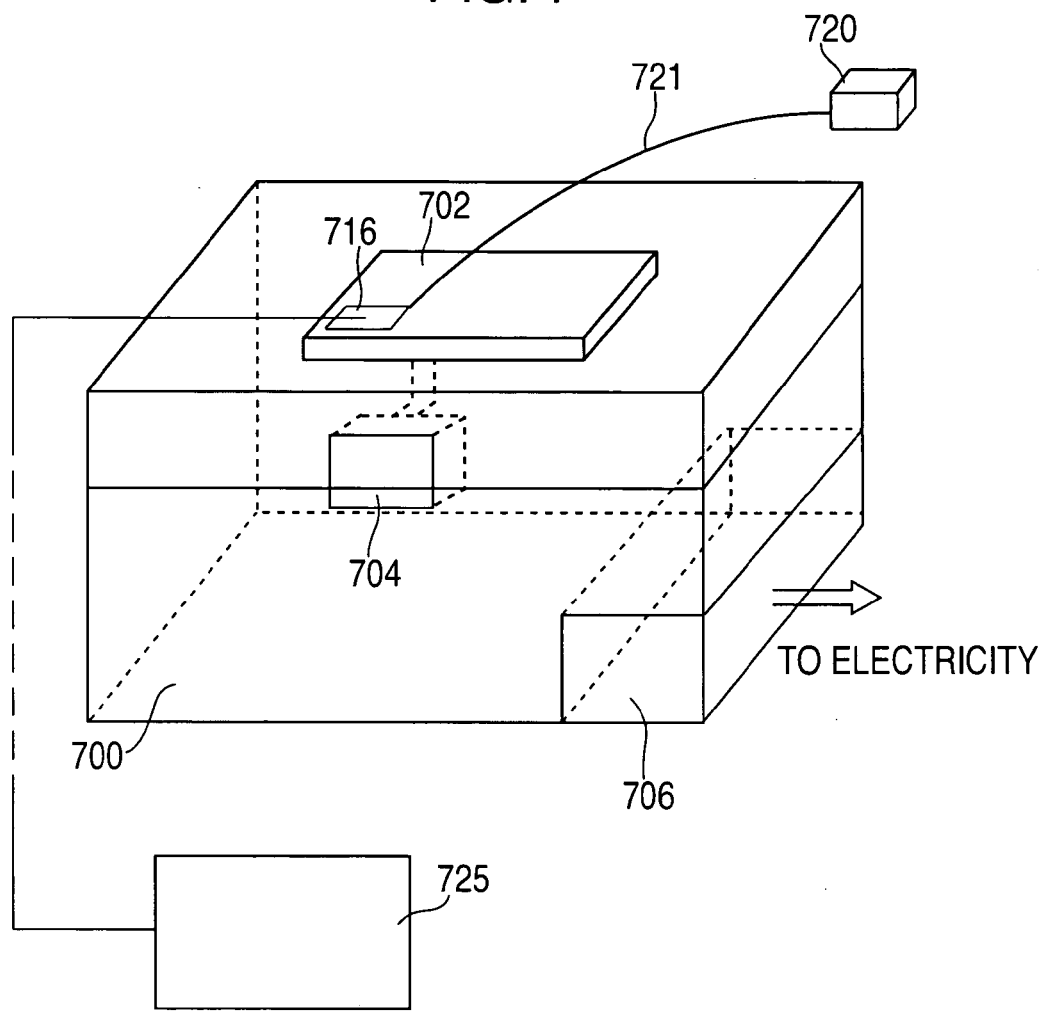
FIG. 7 shows a third preferred embodiment of the present invention.

FIG. 7 shows a third preferred embodiment of the present invention. The delivery box 700 comprises a control panel 702 and an electrically controlled lock 704. The locking/opening features accomplished by the control panel 702 may be same as either one of those described for the first or second preferred embodiments in FIGS. 1, 2 and 3, or in FIGS. 4, 5, 6A and 6B, respectively. In addition, the delivery box 700 is thermally insulated and is equipped with a cooler/heater 706 so that the temperature in the delivery box can be maintained at a certain level. The heater/cooler 706 can be turned on from the central computer, or certain of the access codes can be assigned as "hot" or "cold" access codes that cause the delivery box microprocessor to turn on the heater/cooler and set it to heat or cool. Alternatively, the delivery person may manually power on the heater/cooler 706 in the proper mode. For the heater/cooler 706 to operate, the delivery box 700 has to be supplied with electric power. According to this embodiment, perishable articles such as vegetables, fruit, or food can be kept in the delivery box at a desired temperature.

In one embodiment of the present invention, the heater/cooler unit 706 may also be associated with a temperature sensor 720 (FIG. 7) arranged in proximity to the delivery box 700 so that an ambient temperature around the delivery box 706 can be sensed and communicated (for example, by a cable 721) to the communication means 716 for further communication to the central computer 725. The communication means 716 is similar to the communication means 516 discussed earlier herein. In this manner, the central computer 725 can control the start/stop of the heater/cooler unit 706. For example, the central computer can start heater/cooler unit at a certain time based on, for example, the type of the goods to be delivered and the scheduled delivery time. Therefore, for a highly perishable item, the central computer 725 can start the cooler unit sufficiently in advance of the scheduled delivery time to ensure that the delivery box is sufficiently cooled at the time the perishable good is delivered.

The central computer 725 can also control the temperature of the delivery box by suitably starting the heater/cooler unit 706 and setting it to maintain a calculated target temperature. The target temperature can be calculated only the basis of the type of goods to be delivered or the target temperature can also be calculated based additionally on the ambient temperature sensed by the temperature sensor 720 and communicated to the central computer 725 by the communication means 716. In this manner, the present invention provides that the temperature of the delivery box can be very efficiently controlled by a central computer based on various combinations of, for example, the types and quantities of the delivered goods, the scheduled delivery time, the type or capacity of the heater/cooler unit 706, and/or a sensed temperature such as an ambient temperature in the vicinity of the delivery box 700.

Figure 8A:
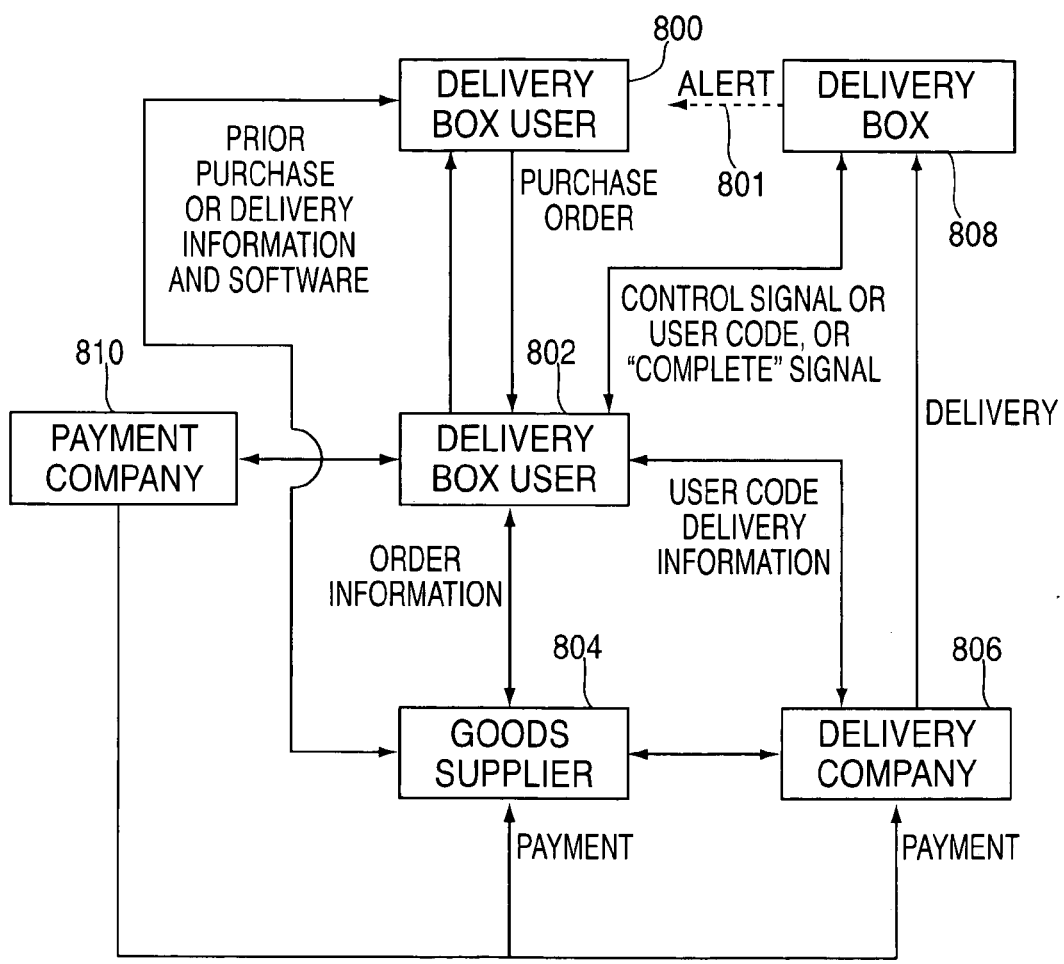
FIG. 8A shows a system that integrates a delivery box user, a delivery box company, a supplier of goods, and a payment provider so that they can communicate and coordinate with one another in order to complete the delivery of goods.

FIG. 8A shows a system that integrates a delivery box user, a delivery box company, a supplier of goods, and a payment provider so that they can communicate and coordinate with one another in order to complete the delivery of goods. The system shown in FIG. 8 can be used in conjunction with the second preferred embodiment of the present invention as described in FIGS. 4, 5, 6A and 6B. FIG. 8A shows a delivery box user 800, a delivery box company 802, a goods supplier 804, a delivery company 806, a delivery box 808, and a payment provider 810, which are all connected to one another via the Internet.

The delivery box user 800 sends a purchase order for goods via the Internet to the delivery box company 802. The delivery box company 802 has a central computer that keeps track of all purchase orders, shipment pick-ups (e.g., airway bill numbers), deliveries and user codes. The delivery box company 802 relays the purchase order to the goods supplier 804. The goods supplier 804 provides the ordered goods to the delivery company 806, and the delivery company 806 notifies the goods supplier 804 of the delivery. Alternatively, the delivery box user 800 may send the purchase order directly to the goods supplier 804. In this case, the delivery box company 802 will detect, track and store the purchase order information. In either case, a shipment ID number (e.g., airway bill number) may be sent by the goods supplier 804 to the delivery box company 802 central computer/Web site and/or user account.

Meanwhile, the delivery box company 802 provides a valid user code to the delivery company 806 that can be used to open the delivery box 808. Alternatively, the shipment ID number may be used as the valid user code if it has been provided to the delivery box company 802. The delivery company 806 staff, when making the delivery, inputs the user code into the delivery box 808 in order to open it. The delivery box 808 may communicate in the manner as described in FIG. 6A, so that the delivery box can be opened by a control signal sent from the central computer of the delivery box company 802. However, the system can also be designed as illustrated in FIG. 6B so that the same user code given to the delivery company 806 or the shipment ID number is sent from the delivery box company 802 also to the delivery box 808. In this case, the delivery box 808 can be designed to open when the user code input to the delivery box 808 by the delivery company 806 coincides with the user code downloaded by the delivery box 808 from the delivery box company 806. The user code can be any number that identifies the delivery, such as an order number, delivery number, or airway number, or some arbitrary number.

After the delivery company 806 places the purchased goods into the delivery box 808, the delivery box 808 alerts the delivery box user 800 of the delivery with an alert signal 801. When the delivery box user 800 opens the delivery box 808, the delivery is complete, and a "complete" signal is sent from the delivery box 808 to the delivery box company 802.

The delivery box company 802 or the goods supplier 804 sends information on the purchase order to the payment provider 810, which is, for example, a credit card company or a bank, or both. In this manner, the payment provider 810 can promptly pay the goods supplier 804 and/or the delivery company 806 for the purchase and delivery of the goods. After payment is complete, the payment company 810 may send the delivery box company 802 or the goods supplier 804 information on the payment, if necessary.

All information on the purchase order and delivery can be tracked and maintained at the delivery box company 802. Thus, the delivery box company 802 can provide data management services to the goods supplier 804, the delivery company 806, or the delivery box user 800 based on that information, for example, by providing a central website. For example, the delivery and receipt time, the identity of the goods supplier 804 and the delivery company 806 can be tracked. In addition, information on the customers' purchase items, quantity, price, frequency of purchase, etc. can be maintained and provided to the goods supplier 804 or the delivery box user 800.

The delivery box user 800 and the goods supplier 804 may be provided with computer software that enables them to retrieve information from the delivery box company 802. The software can also be designed such that the information can be integrated to any data management software that the delivery box user 800 or the goods supplier 804 already has, such as personal or company financial data management software or marketing software. Therefore, the delivery box user 800 or the goods supplier 804 can utilize the information on prior purchases, orders or deliveries for guidance when making future purchases or marketing.

Although the delivery box company 802, the goods supplier 804 and the delivery company 806 are described as separate entities in FIG. 8, any of the functions carried out by these entities may be integrated so that they are provided by one entity. For example, the user may place an order directly with a good supplier who may make its own deliveries, notifying the delivery box company of the transaction and receiving back the user code. In addition, although the purchase order, purchase/delivery information and software, and control signal or user code used to open the delivery box 808 are described as being communicated among the delivery box user 800, delivery box company 802 and delivery box 808 on separate communication links, it should be understood that this is merely for illustration purposes and that the communication can be provided on a single communication link, such as the Internet, as will be recognized by those skilled in the art.

In one aspect of the present invention, the delivery box user 800 can interact with the delivery box company 802 through a personalized portal user interface accessible through the Internet or other computer networks. As discussed above, this portal interface could provide an interface not just to the delivery box company but could also provide an interface to goods suppliers or delivery companies since these functions could be provided by the same or related entities. Therefore, the present invention provides that the portal interface can be customized for each delivery box user so that only information relevant to or desired by that user is displayed to that user. Therefore, a user is provided the ability to cut out the information that they do not need and better streamline and organize the information that they wish to see.

The present invention also provides that special purpose icons or other interaction units (voice, touch, fingerprint activated, for example) are provided for repeat purchases and deliveries so that the user can have a "one-click or touch" reorder interaction. Accordingly, the portal interface allows each user to set up such reorder icons with linkages to one or more of the goods suppliers, delivery companies, delivery box company, and payment providers so the user can activate the reorder, delivery, and payment with a single click on the reorder icon. The present invention also contemplates that the user can use personal shopping lists to speed order processing for repeat custom orders. In addition, the order processing for these custom orders integrates delivery of the ordered goods to the delivery box with an appropriate user code. The user code can be generated separately for each reorder or a particular repeat goods supplier (such as a grocery provider) may be provided with a particular user code that can be used repeatedly until cancelled by the delivery box user.

The portal interface can be implemented in software or in a combination of software and hardware and such implementation is within the abilities of those skilled in the art. For example, in one embodiment, the portal interface can be designed as a browser interface accessible over the Internet. A server application at, for example, the delivery box company, would provide a customized display for each delivery box user so that the delivery box user can display selected content and omit other content. These user selections are associated with the user and are stored, either at the server location and/or at the user location, for example, by using cookie applications. Subsequently, these user selections are used to customize the display for that user.

The portal interface also provides that a user can generate and maintain a personalized shopping list for quicker order processing or repeat custom orders where the personal shopping list is a set of such repeat custom orders. Therefore, the portal interface application stores information related to repeat custom orders, such as, type and quantity of goods, payment mechanisms, goods suppliers, delivery companies, and delivery box access information. The portal interface also provides a single interaction interface (a one-click icon, for example) associated with the stored information related to the repeat custom order so that each repeat custom order can be executed by using the single interaction interface (for example, a one-click).

In one embodiment of the present invention, the portal interface includes profile and content management adapters to third-party systems and matching technologies and algorithms. It is designed to utilize an open, scaleable application architecture for Web session management, secure user authentication and authorization, dynamic and personalized page generation, and transaction handling. Examples of functionality to be provided includes profiling—profile data collected from information in existing customer information files, from information provided explicitly by site visitors, and by observation of visitors' behavior on the site. Visitors' session information will be saved in a transaction log and will be used to update and enrich the visitors' profiles. Profile information will be stored in a widely used and scalable relational database, such as, an ORACLE database.

Another functionality provided includes content management—content management solutions will be made available using templates (web page designs and layouts), products, editorials, advertisements, incentives, and discussion groups. Each of these content types will be managed with tools to create, classify, organize, and publish the content.

Another functionality provided includes personalized interactions with tools provided for the site managers to create and manage "if-then" rules and taxonomy-based matching schemes that determine which content to deliver to website visitors and the conditions under which the content should be delivered. The criteria for content selection can include the visitor's demographic or psychographic variables, historical behavior, current session behavior, context information such as date and time, and marketing logic for delivering incentives, promotions, and recommendations. This will allow the portal interface website to personalize product information, editorials, pricing, advertising, coupons, incentives, and promotions for web-site visitors who fit specified profiles or the predetermined criteria as established by business managers.

Another aspect of the personalization of the portal interface includes providing the ability of a delivery box user (for example, a small business owner) to create their own mini portal by personalizing, for example, page color, font types, font sizes, logo displays together with a display of a logo of the delivery box company or other provider of the portal interface. Therefore, the portal interface can provide an integrated one-stop web based shopping, purchasing, inventory management, supply chain management together with acquiring and delivering goods using a delivery box. Furthermore, the portal can provide interfaces to Enterprise Resource Planning (ERP) applications to automate the purchase, sale, delivery, inventory management, accounting and other information useful to a business.

A further aspect of the personalization can include tracking of all goods acquired by using or facilitated by the portal interface. Therefore, the present invention provides tracking these goods by integrating with the tracking mechanisms of commercial delivery companies or even integrating with information feeds from a Global Positioning System (GPS) technology based system so that the goods can be tracked all the way, for example, to its delivery to the delivery box.

Another feature of the portal interface includes internationalization—a platform that is capable of supporting nearly 20 languages and multiple currencies.

The portal interface is also designed with an open architecture—open adapters will enable easy integration with a company's existing infrastructure. Integration with Enterprise Resource Planning (ERP), market maker and procurement applications will improve efficiencies in the supply chain by, among other things, enhancing the inventory replenishment process.

Another aspect of the portal interface provides an end-to-end delivery marketplace for goods ordered by a delivery box user so that the goods are delivered to the delivery box. Therefore, the portal interface provides additional functionality such as Request for Quotes, normal or reverse auctions, procurement, trading, bartering, etc. so that the delivery box user can acquire the desired or ordered goods using any of these functionalities provided by or linked to by the portal interface.

Figure 8B:
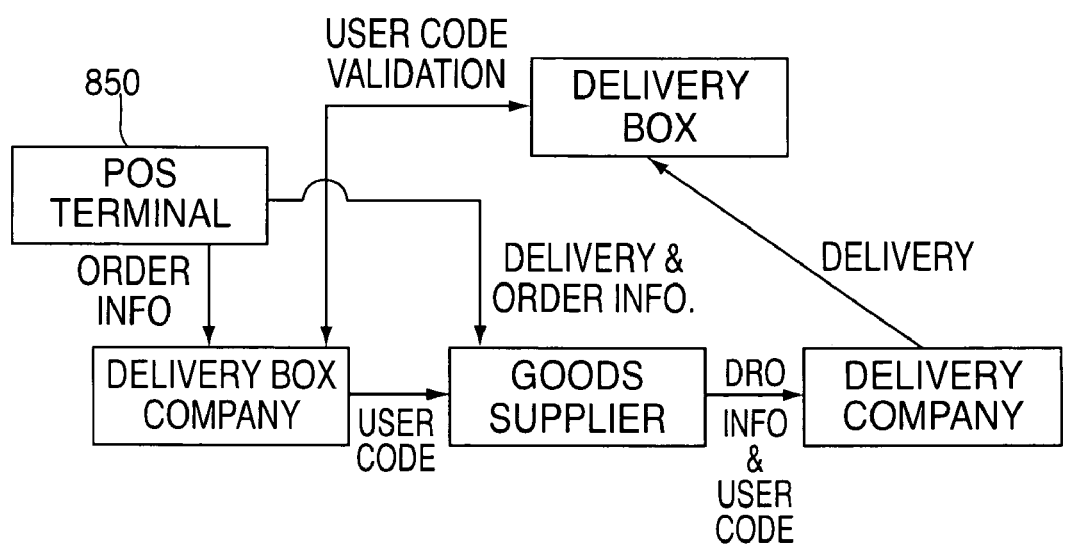
FIG. 8B shows a system in which a delivery box delivery system is integrated into a point-of-sale purchase system.

FIG. 8B shows a system that integrates a delivery box based delivery system with a point-of-sale (POS) transaction, such as, a sale in a retail store or any other location where a delivery box user may make a purchase of goods that need to be delivered. In this system, the POS terminal 850 is used to enter order information to both a delivery box company 855 and a goods supplier 860. The delivery box company 855 generates a user code for access to the delivery box associated with the order entered in the POS terminal 850 and stores the user code, for example, at a central computer controlled by the delivery box company 855. The delivery box company then communicates the user code for that particular order to the goods supplier selected at the POS terminal to supply the goods. Finally, a delivery company 865 is provided with the user code and the goods for delivery to the delivery box 870 which is accessed by using the user code associated with the order. Information about the delivery is then, optionally, communicated back to the delivery box company for further transmission to the other participants in the supply chain for tracking, billing, inventory management, or service management reasons, as discussed further herein.

In this context, it should be noted that the functionalities provided at the POS terminal, delivery box company 855, the goods supplier 860, and the delivery company 865 may be provided by one or more entities and need not be provided by four different entities. For example, the POS terminal 855 may be provided by the goods supplier 860 who may also provide the delivery services of the delivery company 865.

Figure 9A:
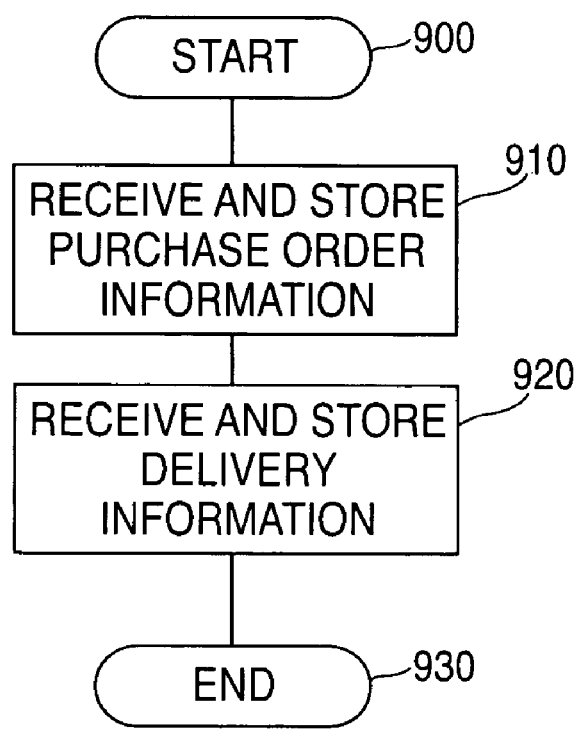
FIG. 9A is a flowchart showing the steps of an information capture and update process related to the order and delivery of goods using the delivery system of the present invention.
Figure 9B:
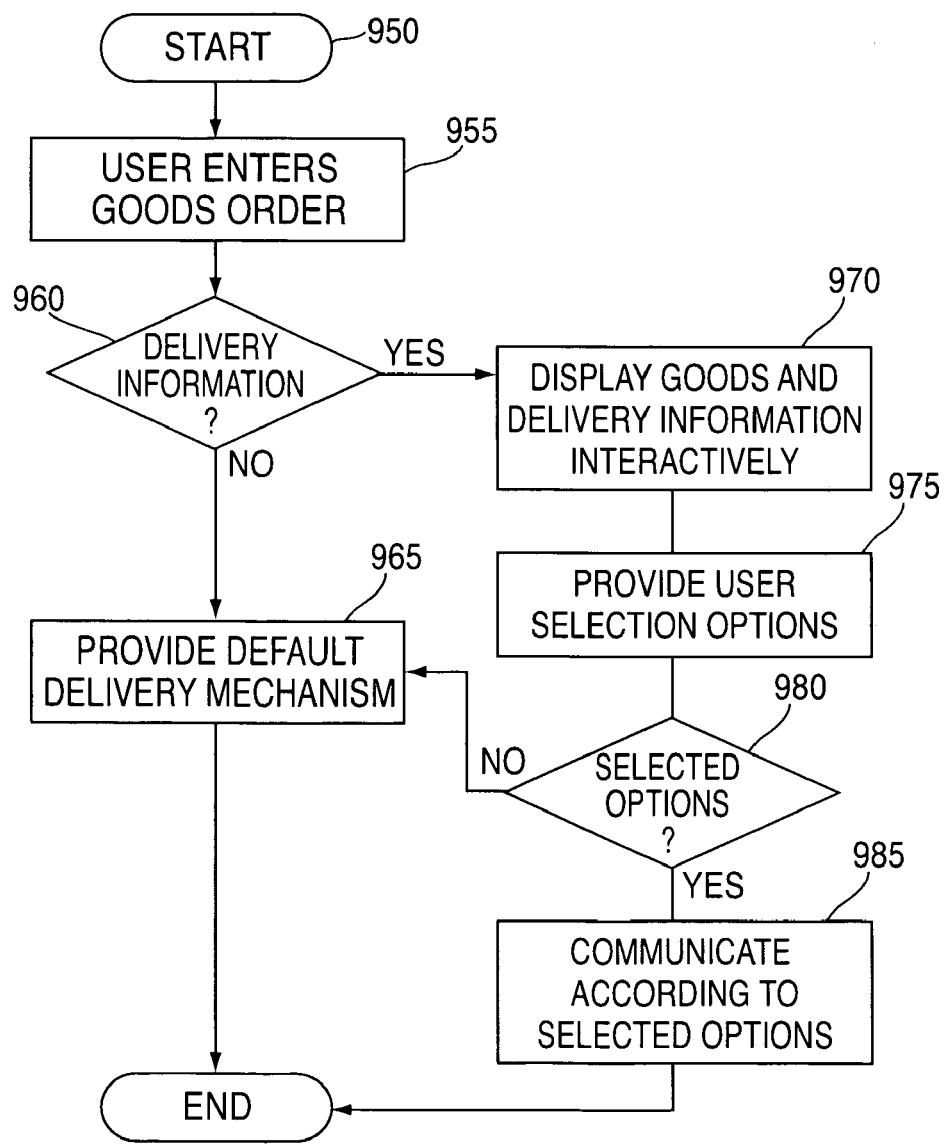
FIG. 9B is a flowchart showing steps of a process by which a delivery box user selects a goods supplier and/or a delivery company based on an interactive display of information related to the goods suppliers and the delivery companies.

FIGS. 9A and 9B describe the functionalities provided by one aspect of the invention which can be implemented at a central computer located, for example, at the delivery box company 802 as shown in FIG. 8. As shown in FIG. 9A, an information capture and update process includes, in step 910, the central computer receiving and storing purchase orders initiated by the delivery box users either directly or through any of the other participants of the delivery system according to the present invention. The information stored includes, for example, types of goods ordered, the quantities ordered, the delivery company selected, the delivery location, value of goods ordered, whether perishable goods were ordered and any other information that may be useful for determining any measure of the performance of goods suppliers or delivery companies. As would be recognized by those skilled in the art, the goods ordered could be ordered through an internet website or using other devices (such as WAP enabled browsers on wireless devices) that can communicate information to the central computer. Also, as discussed earlier herein, the central computer can be implemented either as a mainframe computer or as a network of suitably programmed distributed computers and the data could be stored using database software and storage devices which are within the abilities of those skilled in the art.

In step 920, information relating to deliveries is stored at the central computer. The delivery information is correlated to the order information so that the central computer and track, calculate and store information pertinent to deliveries, for example, the delivery time, by location, by type of goods, by delivery company, or goods suppliers. The process is completed at step 930 and is repeated for each order and delivery combination. As would be recognized by those skilled in the art, the information capture process described above could be implemented as a real-time application constantly updating suitable databases with order and delivery information as received or it could be implemented as a batch process that updates the databases on a periodic basis. In one embodiment, the goods delivered include microchips with low RF transmission that can be scanned and data related to the delivery of goods can be communicated to the central computer using an automated data capture and transmission process.

FIG. 9B shows the steps of a process by which a user can make an informed selection of a goods suppliers and delivery companies based on historical and other qualitative data that is stored or calculated at the central computer. When a user enters a goods order in step 955, the user is provided an option in step 960 to receive further information on delivery companies and goods suppliers. If the user selects no in step 960, the process proceeds to step 965 which provides a default delivery mechanism when the user does not make a selection based on the option provided in step 955. The default delivery mechanism in step 965 can include assigning preferred delivery and goods companies or associating preferred delivery and goods companies based on information, such as, the type of goods ordered or the location of the deliveries.

If the user selects to receive delivery options in step 960, in step 970, the user is provided various goods and delivery related information from the information collected as described with respect to the steps in FIG. 9A, for example. Therefore, the user can be provided delivery times, by goods, by delivery companies, by location as well as aggregate or calculated measures of the quality of deliveries, the breakage rate, accuracy of delivery, or any other information related to the goods and deliveries that is available or can be calculated in the central computer.

In step 975, the user is interactively provided choices related to the goods and delivery companies so that the user can make an informed selection of goods suppliers and delivery companies based on various factors, such as, for example, the types of goods ordered and the location of delivery. The user can also interactively sort and visually display various quality measures, such as delivery time, quality of goods, accuracy of delivered goods, for example.

In step 980, the process checks whether the user has selected a goods supplier and/or a delivery company option. If yes, the process proceeds to step 985 to communicate the order information to the selected goods supplier(s) and/or the selected delivery companies. If not, the process proceeds to step 965 to implement the default delivery mechanism as described above.

While the preferred embodiments of the present invention have been described, it will be understood that numerous modifications and changes will occur to those skilled in the art. For example, the size, structure or shape of the delivery boxes in the present invention is not limited to those described in FIG. 1 or 4, but can be designed in any size, structure or shape that serves the purposes of the delivery box. The delivery box may have one, two or more openings. The delivery box may also be of the front-load type or can be opened from any direction that serves the purposes of the delivery box. The openings of the delivery box may be located inside or outside a house, apartment, building, or office. In addition, the delivery box may be a secure box that cannot be destroyed or impaired by force, fire or water, so that the delivery items are kept unimpaired in the delivery box. It may have a protective steel lining. The delivery box may be heavy so that it cannot be taken away easily. The delivery box may also be designed such that it can be opened from inside the house or building even without a user PIN but cannot be opened from outside the house without a valid access/user code.

The circuitry contained in the delivery box according to the present invention is not limited to those described in FIG. 2 or 5, and it can be designed in any manner that provides secured access to the delivery box. For example, the speaker for alerting the delivery box user of a delivery may be replaced by any means that can alert the user, for example, by a light signal or an icon on the display. The control panel described in FIG. 5 may be merely an information apparatus that functions as if it were a terminal communicating with the central computer and executing the instructions provided by the central computer. The procedure for opening the delivery box according to the present invention is also not limited to those described in FIG. 3, 6A or 6B, and it can be carried out in any manner that provides secured access to the delivery box.

Also for example, the delivery box may have a remote-controlled locking means that deactivates all access/user codes except the user PIN, so that only the delivery box user can open the box. This feature can be used to enhance the security of the delivery box when it is used to deliver valuable items, and it is particularly useful to facilitate delivery of certain items such as expensive goods or pharmaceuticals that need to be delivered in a secure manner until retrieved by the delivery box user. In addition, the means to input the access code or the user code need not necessarily be a keyboard, as illustrated in FIG. 2 or 5, but can be any input means, for example, a bar code reader. If a bar code reader is used, then the access code or user code may be included in the shipment airway/delivery bar codes conventionally used for delivery of goods. The delivery package may be simply passed across a stationary bar code reader element of the type used in handheld bar code scanners.

Furthermore, it is possible that the delivery box itself is delivered and/or added to a house, building, apartment, or office. A delivery box may also be added to another delivery box.

It is also conceivable that the access codes are not used to open a delivery box but to access a house, office or building. In this case, the delivery/order number may also serve as the access code to the house, office or building, and the deliverables may be left inside the door.

Other embodiments of the invention will be apparent to those skilled in the art from a consideration of the specification and the practice of the invention disclosed herein. It is intended that the specification be considered as exemplary only, with the true scope and spirit of the invention also being indicated by the following claims.

We claim:

1. A method of managing purchase, delivery, and user information in a delivery system comprising a delivery box user, a delivery company, and a network connected delivery box, the method comprising the steps of:
   receiving a purchase order for goods from a delivery box user;
   associating, at a central computer, a valid user code with the purchase order;
   delivering the ordered goods to the network connected delivery box, the network connected delivery box being connected to the central computer through a computer network and having an enclosure configured to store the ordered goods, wherein delivering the ordered good comprises:
      providing, at the network connected delivery box, a user code by the delivery company,
      verifying the provided user code by an automated comparison to the valid user code associated at the central computer, and
      providing access to the delivery box if the provided user code is verified based on the automated comparison to the valid user code.

2. The method according to claim 1, further comprising storing, at the central computer, delivery information for each delivery by each delivery company.

3. The method according to claim 2, further comprising providing, to a delivery box user, aggregate and average delivery information for each delivery company.

4. The method according to claim 3, wherein the step of providing aggregate and average delivery information for each delivery company includes providing the delivery information sorted by the goods delivered.

5. The method according to claim 2, further comprising:
   after receiving a purchase order from a delivery box user, displaying aggregate and average delivery information for each delivery company; and
   providing a choice to the delivery box user to select a delivery company after viewing the displayed delivery information by delivery company.

6. The method according to claim 5, further comprising:
   receiving a selection of a delivery company from the delivery box user; and
   communicating the valid user code to the delivery company selected by the delivery box user.

7. The method according to claim 1, further comprising:
   downloading the valid user code to a delivery box memory to provide a backup verification option if communication between the delivery box and the central computer cannot be established.

8. The method according to claim 1, wherein the computer network is the Internet.

9. The method according to claim 1, further comprising:
   receiving ambient temperature information from a temperature sensor arranged in proximity to the delivery box; and
   providing a signal to set a heating or cooling unit, associated with the delivery box, at an optimum temperature based on the ambient temperature information.

10. The method according to claim 9, wherein the step of providing the signal comprises:
    determining type of ordered goods and an expected delivery time of the ordered goods to calculate a time for providing the signal to set the heating or cooling unit; and
    providing the signal to the heating or cooling unit at the calculated time.

11. A method of managing purchase and delivery information in a delivery system comprising a delivery box user, a delivery box company, a goods supplier, a delivery company, and a network connected delivery box having an enclosure configured to store goods, comprising the steps of:
    detecting, tracking and storing a purchase order for goods transmitted from the delivery box user to the goods supplier by a central computer in the delivery box company so as to form a database of information on purchases by the delivery box user;
    providing a valid user code to be used to open the enclosure of the delivery box from the central computer in the delivery box company to the delivery company and maintaining a database of information on delivery by tracking the user code; and
    transmitting a completion signal from the delivery box to the computer in the delivery box company over a computer network after the delivery of goods by the delivery company is complete so as to update the database of delivery information, wherein the delivery of goods by the delivery company includes an automated comparison of the valid user code before access to the delivery box is permitted.

12. The method of claim 11, further comprising the step of providing information maintained in the database of purchase information or the database of delivery information to the delivery box user, the goods supplier, or the delivery company.

13. The method of claim 11, further comprising the step of providing the purchase information to a payment provider so that the payment provider can make payment for the purchase or delivery of goods.

14. The method of claim 11, further comprising the step of providing a shipment ID number from the delivery company to the delivery box company and using the shipment ID number as a valid user code.

15. The method of claim 11, wherein functions of the delivery box company, the goods supplier, and the delivery company are provided by one entity.

16. A method for managing purchase and delivery information in a delivery system comprising a delivery box user, a delivery box company, a goods supplier, a delivery company, and a network connected delivery box having an enclosure configured to store goods, comprising the steps of:

providing a purchase order from the delivery box user to the delivery box company;

relaying the purchase order from the delivery box company to the goods supplier and maintaining the information on the purchase order in the delivery box company so as to form a database of information on purchases by the delivery box user;

providing, at a central computer, a valid user code to be used to open the enclosure of the delivery box from the delivery box company to the delivery company and maintaining a database of information on delivery by tracking the user code; and transmitting a completion signal from the delivery box to the central computer in the delivery box company after the delivery of goods by the delivery company is complete so as to update the database of delivery information, wherein the delivery of goods by the delivery company includes an automated comparison of the user code before access to the delivery box is permitted.

17. The method of claim 16, further comprising the step of providing information maintained in the database of purchase information or the database of delivery information to the delivery box user, the goods supplier, or the delivery company.

18. The method of claim 16, further comprising the step of providing the purchase information to a payment provider so that the payment provider can make payment for the purchase or delivery of goods.

19. The method of claim 16, further comprising the step of providing a shipment ID number from the delivery company to the delivery box company and using the shipment ID number as a valid user code.

20. The method of claim 16, wherein functions of the delivery box company, the goods supplier, and the delivery company are provided by one entity.

* * * * *